(12) United States Patent
Camaiani

(10) Patent No.: US 6,438,809 B1
(45) Date of Patent: Aug. 27, 2002

(54) PARROT CLASP WITH AN OPENING BUTTON

(75) Inventor: Daniele Camaiani, Arezzo (IT)

(73) Assignee: F.A.OR. S.p.A., Arezzo (IT)

( * ) Notice: Subject to any disclaimer, the term of this patent is extended or adjusted under 35 U.S.C. 154(b) by 0 days.

(21) Appl. No.: 09/782,058

(22) Filed: Feb. 14, 2001

(30) Foreign Application Priority Data

Oct. 6, 2000 (IT) .................................... AR2000A0045

(51) Int. Cl.[7] .............................................. F16B 45/06
(52) U.S. Cl. ...................................... 24/599.4; 24/599.1
(58) Field of Search ........................... 24/598.4, 598.7, 24/599.1–600.2, 600.9, 601.1; 294/82.17, 82.2, 82.21, 82.27; 59/86–89; 63/3.1, 12, 13

(56) References Cited

U.S. PATENT DOCUMENTS

| 212,950 | A | * | 3/1879 | Kempshall | 24/599.8 |
| 280,792 | A | * | 7/1883 | Bulley et al. | 24/599.8 |
| 316,269 | A | * | 4/1885 | Jewett | 24/599.9 |
| 353,891 | A | * | 12/1886 | Smith | 24/599.8 |
| 493,300 | A | * | 3/1893 | Ross | 24/599.8 |
| 527,498 | A | * | 10/1894 | Judd | 24/599.4 |
| 559,640 | A | * | 5/1896 | Walker | 24/599.8 |
| 976,414 | A | * | 11/1910 | Waybright | 24/599.6 X |
| 1,672,710 | A | * | 6/1928 | Chittenden | 24/599.6 X |
| 2,124,835 | A | * | 7/1938 | Strutz | 24/599.8 |
| 2,872,717 | A | * | 2/1959 | Kelley | 24/599.1 |
| 3,317,972 | A | * | 5/1967 | Harley | 24/599.4 |
| 4,340,999 | A | | 7/1982 | Chini | 24/599.4 |
| 5,117,539 | A | | 6/1992 | Shrader et al. | 24/599.8 |
| 5,479,795 | A | | 1/1996 | Neri | 63/3.1 |
| 5,832,571 | A | * | 11/1998 | Kanamori | 24/599.6 |

FOREIGN PATENT DOCUMENTS

GB 2 106 584 A * 4/1983 ................ 24/599.8

* cited by examiner

Primary Examiner—Robert J. Sandy
Assistant Examiner—Ruth C. Rodriguez
(74) Attorney, Agent, or Firm—Dennison, Schultz & Dougherty

(57) ABSTRACT

A clasp equipped with an external shell (1), an internal thrust spring (2) and of a rotating lever (3) having a protrusion shaped activation button (8) to allow the user to act upon it with a pressing action to determine its opened position. The external shell (1) is shaped like a hooking bracket on the first end (4), while towards its middle section it is equipped with an ample internal lodging space (5) and on the second end it is shaped like a hook (6). The rotating lever (3) is fixed like a fulcrum inside the external shell (1) from one of its ends while the other end is shaped like an arm (9) to interact with the end of the external shell (1) shaped like a hook (6) to obtain the closed position of the clasp.

3 Claims, 1 Drawing Sheet

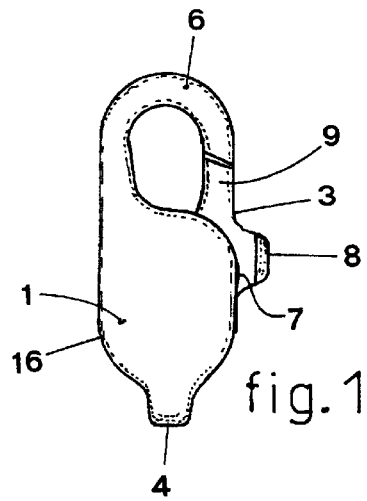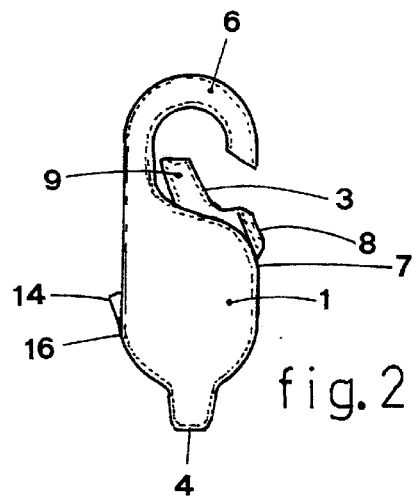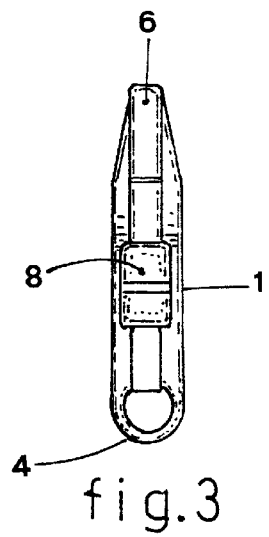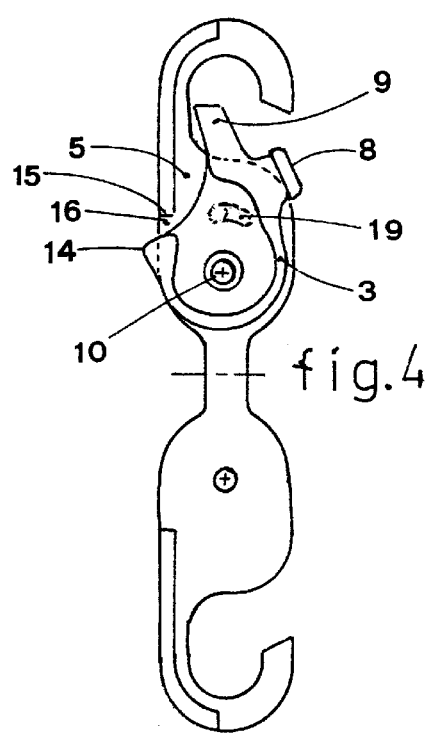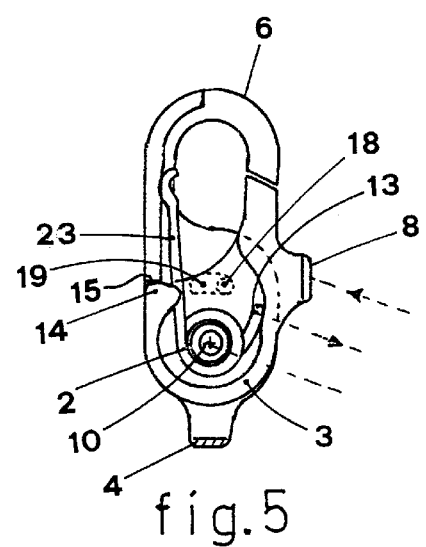

PARROT CLASP WITH AN OPENING BUTTON

BACKGROUND OF THE INVENTION

The invention consists of a clasp of the parrot type, equipped with an opening button, which is particularly indicated to join the ends of chains with which ornamental necklaces and bracelets are made so it is indicated for jewellery, silverware and costume jewellery in general.

There are known parrot clasps which are formed by an external shell, by a rotating lever and by an internal thrust spring. The external shell is equipped with a hooking cavity on the first end, with an ample cavity at the centre where the rotating lever and the internal thrust spring are lodged, and the other end is shaped like a hook. The rotating lever acts like a balance arm: one of its ends, shaped like an arm, interacts with the hook on the external shell, the other end protrudes from the said external shell and forms the activation tab.

Inside the cavity of the external shell there is the pin type thrust spring whose threadlike end branches, more or less of the same length, interact respectively with the external shell and with the rotating lever, constantly pushing the latter towards the closed position.

The above described parrot clasp is widely used because easy to use, and because when it is set on a bracelet or a necklace it is also attractive.

The inconvenience of said clasp is due to the fact that the tab which activates the rotating lever is very small and is usually activated by the user with the thumb nail therefore, when the internal spring is very hard, the user's nail can break.

In order to avoid said inconvenience, which is considered seriously by those users who take good care of their nails and keep them long, clasps, similar to the parrot ones, have been created whose rotating element is not pulled but pressed to move it from the closed to the open position so that it is not easy to break ones nails when activating it.

One of said clasps, patented in the U.S.A. with U.S. Pat. No. 4,340,999, filed on Jul. 16, 1980, consists of an outer shell ending with a hook and of a rotating lever which is adequate to interact with the free end of said hook. Said lever is hinged on to the external shell towards one end and a portion of its central part is placed in view through a flared depression on the edge of the same external shell. Through said depression the user can push the lever and rotate it towards the open position, that is the position in which the free end of the lever is distant from the hook-shaped end of the external shell. Said clasp is therefore activated by means of a pressing action to be carried out with the finger nail or with the finger tip to push the rotating lever and therefore the clasp to its open position. The pressing action will be contrasted by the resistance carried out by the internal spring. Another clasp, this one also similar in shape as those of the parrot type, patented in the U.S.A. on Sep. 3, 1991 and granted with U.S. Pat. No. 5,117,539 also consists of an external shell, of a rotating lever and of the same type of internal spring. At one of its ends the external shell is equipped with a hooking hole, at its centre it is equipped with an ample cavity to lodge the internal spring and the rotating lever, the second end is shaped like a hook with which the rotating lever interacts to determine the closed position of the clasp. The external shell of this clasp is also equipped with two openings through which the ends of the rotating lever protrude outwards as this acts like a balance arm. One of its ends is shaped like an arm to interact with the hook shaped end of the external shell; the other end is instead shaped like a knee and juts out of the second opening of the shell. The user obtains the rotation of the rotating lever contrasting the resistance of the internal spring, by means of a pressing action exerted on the knee shaped end.

In this clasp the rotating lever, shaped like a balance arm, is constantly subject to the pressure exercised by the internal spring which pushes it towards the closed position and, when activated by an adequate pressure applied by the user on the thin jutting knee, it rotates to the open position.

The pressure applied by the user is practically superimposed to the resistance exercised by the internal spring. Therefore, in order to defeat the action of the latter the user is required to apply at least a pressure that is slightly higher than the action of said internal spring.

Given the much reduced size of the parrot type clasps and the thinness of the protruding knee of the rotating lever shaped like a balance arm, the activation of the latter is complex if a strong internal spring is used to ensure a satisfactory operation of the same clasp over a long period of time.

Finally, there is another known clasp, this one is also similar in shape to the parrot type ones, patented in the U.S.A. on Mar. 11, 1994, granted with U.S. Pat. No. 5,479,795, comprising an external shell terminating at one end with a hook-shaped protrusion and furnished at the other end with a U-shaped strip which creates the hooking cavity. The strip can also hold a diamond, whose rear tip passes through the external shell and acts like the rotation pivot for the rotating arm.

Said rotating arm is housed inside the external shell and its free end is still capable of interacting with the hook-shaped end of the same external shell. However, said rotating arm is furnished towards its middle with a tab that protrudes outside the shell, by pressing this tab the arm is made to rotate and therefore positions the clasp from the closed position to the opened one, this is contrasted by the internal spring. The rotating arm of said clasp operates like a lever with the fulcrum at one end, and towards the middle is pushed constantly to the closed position by the internal spring and pushed on the jutting tab by the user's action when it must be opened. This clasp is shaped so that its rotating arm operates like a lever of the third type. It is therefore an inefficient lever since the user must exercise a much higher pressure against the resistance of the internal spring for it to open.

The known parrot type clasps, whether those with the protruding end of the rotating lever that require to be dragged, or those with the protruding end of the rotating lever to be activated by compression to position them in the open position, require external pressures that are higher than the resistance carried out by the internal spring. Therefore, when the internal spring is strong, to ensure the proper operation of said clasps over time, it also becomes difficult to take them from the closed position to the opened one. Said difficulty is considerable because the part on which the pressure must be applied to open the clasp is very thin, so it requires using ones finger nail and not the user's finger tip to carry out its rotation.

SUMMARY OF THE INVENTION

The aim of the present invention is to create a clasp that is simple to construct so that it has a low cost, which has a parrot shape so that it is apropriate to be used on ornamental necklaces and bracelets, as well as being easy to modify in the external profile so that it can be adapted aesthetically for ornamental chains of varying shapes, without altering its functional logic. Another aim is to present a rotating lever that is appropriate to interact with the hook-shaped end of the external shell and which can be activated by a relatively small amount of pressure, even when a very strong internal spring is used. Another aim again is that of having a clasp that can be easily activated, which therefore presents a pressure point capable of being activated by the pressure of the users finger tip and which does not require the use of the corresponding nail, preserving it in this way from any type of pressure and therefore the danger of breakage.

The invention that has allowed to obtain said results consists of a clasp equipped with an external shell, that is molded or microfused, with a strong internal thrust spring and a rotating lever with a protrusion shaped like an activation button. At one end the external shell is shaped like a hooking bracket, towards the centre it is equipped with an ample internal lodging and at the second end it is shaped like a hook, while on one side, on the side to which its hook-shaped end converges, it has a long opening through which the activating button-shaped protrusion of the rotating lever emerges and on which the latter is allowed to rotate. The rotating lever therefore is furnished with a side protrusion shaped like a button, with a relatively large activation head, which facilitates its activation with the finger tip of the finger that pushes it. Said protrusion is also placed at a distance from the rotation fulcrum that is higher than that existing between said rotation fulcrum and the point on which the internal spring pushes with its reaction or resistance pressure. In this way the rotating lever acts like an efficient lever of the second type. Another advantage of the button shaped protrusion is due to the fact that when its head or bulge hits the containing shell, it also determines the open position of the clasp. The button-shaped protrusion also carries out an advantageous function due to its position in respect to the rotation action of the same lever and in respect to the point on which the internal resisting spring acts, since it allows the use of a very strong internal spring, which ensures the continuous function of the same clasp, even when the pressure required to open it is the same as that of the known clasps.

BRIEF DESCRIPTION OF THE DRAWINGS

Said clasp can be easily understood in its operation by following the detailed description herebelow which refers to the preferred embodiment reproduced in the drawings of the enclosed table in which:

FIG. 1 is a front view of the clasp in its closed position;

FIG. 2 is the front view of the clasp in the open position;

FIG. 3 is the side view of the clasp from the side on which the protrusion shaped like an activation button is placed;

FIG. 4 is the front view of the external shell in an open position, in the event in which it is produced by molding, combined with the rotating lever placed in the open position;

FIG. 5 is the front view of a part of the external shell combined with the rotating lever and the internal spring.

It is understood that the drawings exemplify the preferred embodiment of the invention, with the profile of the external shell and the rotating lever subject to variations so as to assume the most appropriate aesthetic shape on the basis of the type of ornamental chain to which the clasp is to be applied.

DESCRIPTION OF THE PREFERRED EMBODIMENT

The invention consists therefore of a parrot type clasp made of metal or metal alloy normally by means of molding or micro-fusion process. It consists of an external shell 1 with internal thrust spring 2 and a rotating lever 3, with the external shell 1 shaped like a bracket at one end 4, or in any way equipped with a hole which constitutes the hooking point for a stable junction to the chain with which bracelets and necklaces are made, in its central part it is equipped with an ample internal lodging 5, while at the second end it is shaped like a hook 6. On its side, the one which faces the hook end 6, there is an opening 7, from which the rotating lever 3 emerges, and in particular the protrusion shaped like an activation button 8 and the long arm 9, the latter which converges towards the end part of hook 6.

The rotating lever 3 has an activation protrusion 8 with head shaped like a button, that is it ends with a bulge or head whose width is generally not more than the thickness of the external shell 1 so as not to create a friction and catching point for the user's clothes.

At the same time, the size of said bulge or head on the activation protrusion 8 is such as to allow it to be easily activated by the user's fingertip, without there being any danger of it penetrating in the user's flesh which, if it should happen, would require the use of a harder surface like that of the user's finger nail, usually of the thumb or index fingers.

The activation protrusion 8 on rotating lever 3 is also sized so that the wider head stops on the side of the external shell 1 when rotating lever 3 reaches the open position, as shown in FIGS. 2 and 4.

Furthermore said activation protrusion 8 and its wider head are placed at a distance from the rotation fulcrum 10 which is more than the distance between said pivot or fulcrum and the point in which the end of the relatively short arm 13 of the internal thrust spring 2 pushes on the same rotation lever 3, as shown in FIG. 5 with the dotted lines.

The internal thrust spring 2, usually a pin type spring, ends with two arms of which one is relatively long 23 which interacts with the external shell 1, and the other 13 is relatively short and as indicated above interacts with rotation lever 3.

In the closed position, the end shaped like an arm 9 of the rotating lever 3 is pushed by spring 2 to the position lined up with the end of the structure shaped like a hook 6.

Said position can be determined by the point where the arm shaped end 9 contacts the corresponding hook-shaped end 6. There are also two alternative solutions with two other contact points.

In the first of the two alternative solutions it is foreseen that the rotating lever 3, as shown in the drawings, is equipped with protruding tip 14 whose size allows it to interact with the corresponding contact surface 15 of the external shell 1. The protruding tip 14 and the contact point 15 are shaped so that they perfectly adhere with each other when the arm-shaped end 9 of the lever 3 is perfectly aligned with the hook-shaped end 6 of the external shell 1.

In said solution shell 1 is equipped with a second slot 16 which allows the protruding contact tip 14 to slide in it.

In the second practical solution, the rotating lever 3 is equipped with the protruding tip 18 (see FIG. 5) which is housed inside the corresponding pressed space 19 on the surface which defines the internal cavity 5 of external shell 1. Said pressed space 19 is shaped and sized to block the rotation of rotating lever 3 into the position which determines the closed position of the clasp, which is the position in which the arm-shaped end 9 and the hook-shaped end 6 face each other whether they adhere or not.

Therefore, in this second solution the jutting dent 18 is always kept within the pressed space 19 and when the clasp is activated it rotates within said space Said solutions can either be used separately or combined on the same clasp and are adequate to determine the closed position of the clasp through the hook shaped end 6 and the arm shaped end 9 of the rotating lever 3 when aligned with each other.

What is claimed is:

1. A parrot clasp with an opening button, used to join chains in the production of ornamental necklaces and bracelets, comprising an external shell (1), an internal thrust spring (2), a rotating lever (3), a fulcrum (10) wherein the thrust spring (2) is placed around the fulcrum on which the lever rotates, with the external shell shaped like a bracket on a first end (4) through which a hooking point is created, on its central part is equipped with an ample internal lodging space (5), and shaped like a hook on a second end (6), an opening (7), at least on the side where the second end (6) is directed, from where a protruding activation point of the rotating lever (3) emerges, said clasp characterized so that the rotating lever (3) is equipped with a protrusion (8) shaped like a button, wherein said protrusion (8) is sized to allow its wider head to hit onto the side of the external shell (1) when the rotating lever (3) reaches an open position and wherein said wider head is symmetric with respect to a median plane of the rotating lever (3).

2. The parrot clasp, as claimed in claim 1, characterized by the fact that the protrusion shaped like a button (8) of the rotating lever (3) ends with a bulge or head whose width is not more than the thickness of the external shell.

3. A parrot clasp with an opening button, used to join chains in the production of ornamental necklaces and bracelets, comprising an external shell (1), an internal thrust spring (2), a rotating lever (3), with the external shell shaped like a bracket on a first end (4) through which a hooking point is created, on its central part is equipped with an ample internal lodging space (5), and shaped like a hook on a second end (6), an opening (7), at least on the side where the second end (6) is directed, from where a protruding activation point of the rotating lever (3) emerges, said clasp characterized so that the rotating lever (3) is equipped with a protrusion (8) shaped like a button, wherein said protrusion (8) is sized to allow its wider head to hit onto the side of the external shell (1) when the rotating lever (3) reaches an open position, wherein said protrusion is shaped like a button (8) where the rotating lever (3) ends with a bulge or head whose width is not more than a thickness of the external shell, and wherein said wider head is placed at a distance from a rotation fulcrum (10) which is more than a distance between said rotation fulcrum (10) and a point on which the end of a relatively short arm (13) of the internal spring (2) pushes onto rotating lever (3).

* * * * *